United States Patent
Tomita

(10) Patent No.: US 9,710,200 B2
(45) Date of Patent: Jul. 18, 2017

(54) ADAPTIVE JOB EXECUTION APPARATUS FOR EXECUTING A JOB WITH A PLURALITY OF ALTERNATIVE SETS OF EXECUTING CONDITIONS, JOB EXECUTION METHOD, AND COMPUTER-READABLE STORAGE MEDIUM FOR COMPUTER PROGRAM

(75) Inventor: Kouichi Tomita, Osaka (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 687 days.

(21) Appl. No.: 12/697,389

(22) Filed: Feb. 1, 2010

(65) Prior Publication Data

US 2010/0199278 A1 Aug. 5, 2010

(30) Foreign Application Priority Data

Feb. 2, 2009 (JP) ................................. 2009-021680

(51) Int. Cl.
G06F 9/46 (2006.01)
G06F 15/00 (2006.01)
G06F 3/12 (2006.01)
G06K 15/02 (2006.01)
G06K 15/00 (2006.01)

(52) U.S. Cl.
CPC .......... *G06F 3/1203* (2013.01); *G06F 3/1255* (2013.01)

(58) Field of Classification Search
USPC .............................. 718/1–105; 358/1.11–1.18
See application file for complete search history.

(56) References Cited

U.S. PATENT DOCUMENTS

| | | | |
|---|---|---|---|
| 5,129,639 | A | 7/1992 | DeHority |
| 5,467,434 | A | 11/1995 | Hower, Jr. et al. |
| 2004/0046970 | A1* | 3/2004 | Miyachi ..................... 358/1.1 |
| 2005/0068566 | A1* | 3/2005 | Nishiguchi ................ 358/1.15 |
| 2006/0012835 | A1 | 1/2006 | Shimizu |

(Continued)

FOREIGN PATENT DOCUMENTS

| | | |
|---|---|---|
| JP | 06-110629 | 4/1994 |
| JP | 3720544 | 11/2005 |

(Continued)

OTHER PUBLICATIONS

Office Action (Notification of Reason(s) for Refusal) dated Jan. 18, 2011, issued in the corresponding Japanese Patent Application No. 2009-021680, and an English Translation thereof.

(Continued)

*Primary Examiner* — Bing Zhao
(74) *Attorney, Agent, or Firm* — Buchanan Ingersoll & Rooney PC

(57) ABSTRACT

An image forming apparatus is provided with the following functional portions: a printable/unprintable determination portion that determines whether or not a print job can be executed based on any of a plurality of conditions specified by a user; and a first printing process portion that executes, if it has been determined that the print job can be executed based on any of the plurality of conditions, the print job based on any of executable conditions among the plurality of conditions, the executable conditions being conditions based on which the print job can be executed.

18 Claims, 13 Drawing Sheets

(56) References Cited

U.S. PATENT DOCUMENTS

| | | | |
|---|---|---|---|
| 2006/0061817 A1* | 3/2006 | Kakigi et al. | 358/1.15 |
| 2006/0227363 A1* | 10/2006 | Ogura | 358/1.15 |
| 2007/0014613 A1 | 1/2007 | Ohashi | |
| 2007/0263240 A1* | 11/2007 | Hirai | 358/1.11 |
| 2007/0285724 A1* | 12/2007 | Saito | 358/1.18 |
| 2008/0291489 A1 | 11/2008 | Takahashi et al. | |
| 2009/0168100 A1* | 7/2009 | Huster | 358/1.15 |
| 2009/0303524 A1* | 12/2009 | Kanekawa et al. | 358/1.15 |
| 2010/0188680 A1* | 7/2010 | Xiao | 358/1.13 |
| 2010/0309495 A1* | 12/2010 | Nakagawa | 358/1.9 |

FOREIGN PATENT DOCUMENTS

| | | |
|---|---|---|
| JP | 2006-031465 | 2/2006 |
| JP | 2007-058837 | 3/2007 |
| JP | 2008-293266 A | 12/2008 |

OTHER PUBLICATIONS

Office Action (Notification of Reason(s) for Refusal) dated Apr. 5, 2011, issued in the corresponding Japanese Patent Application No. 2009-021680, and an English Translation thereof.

\* cited by examiner

FIG. 7

```
┌─────────────────────────────────────────────────────────┐
│              CONDITION SETTING SCREEN                    │
│                                                          │
│            THE ORIGINAL PAPER SIZE IS A3.                │
│        PLEASE SET CONDITIONS FOR PRINTING, etc.          │
├─────────────────────────────────────────────────────────┤
```

| | | |
|---|---|---|
| FIRST PREFERENCE | ● A3, Z-FOLDING<br>○ A4, REDUCTION PRINTING | ○ COLOR PRINTING<br>○ 2 IN 1 PRINTING |
| SECOND PREFERENCE | ○ A3, Z-FOLDING<br>● A4, REDUCTION PRINTING | ○ COLOR PRINTING<br>○ 2 IN 1 PRINTING |
| thIRD PREFERENCE | ○ A3, Z-FOLDING<br>○ A4, REDUCTION PRINTING | ○ COLOR PRINTING<br>○ 2 IN 1 PRINTING |

[ OK ]   [ CANCEL ]

| DEVICE NAME | IP ADDRESS | FUNCTION |
|---|---|---|
| MFP_01 | 192.168.11.101 | A3, Z-FOLDING<br>A4, REDUCTION PRINTING |
| MFP_02 | 192.168.11.102 | A3, Z-FOLDING |
| MFP_03 | 192.168.11.103 | A4, REDUCTION PRINTING |
| MFP_04 | 192.168.11.104 | COLOR PRINTING<br>STAPLING |
| MFP_05 | 192.168.12.105 | A3, Z-FOLDING<br>A4, REDUCTION PRINTING<br>COLOR PRINTING |
| ⋮ | ⋮ | ⋮ |

FIG. 11

PRINTING CANNOT BE CARRIED OUT BASED ON SPECIFIED CONDITION.

TO PERFORM PRINTING BY USING THIS MFP (IMAGE FORMING APPARATUS), PRESS "PRINT" BUTTON.

TO PERFORM PRINTING BY USING ANOTHER MFP, PRESS "CHANGE" BUTTON.

TO CANCEL PRINTING, PRESS "CANCEL" BUTTON.

| PRINT | CHANGE | CANCEL |

WD2

ADAPTIVE JOB EXECUTION APPARATUS
FOR EXECUTING A JOB WITH A
PLURALITY OF ALTERNATIVE SETS OF
EXECUTING CONDITIONS, JOB
EXECUTION METHOD, AND
COMPUTER-READABLE STORAGE
MEDIUM FOR COMPUTER PROGRAM

This application is based on Japanese patent application No. 2009-021680 filed on Feb. 2, 2009, the contents of which are hereby incorporated by reference.

BACKGROUND OF THE INVENTION

1. Field of the Invention

The present invention relates to an apparatus, a method, and the like for executing a job such as a print job.

2. Description of the Related Art

There has been proposed a job execution method in which data used to execute a job is accumulated in a server and the job is executed by an apparatus arbitrarily selected by a user from among a plurality of apparatuses.

For example, a job execution method has been proposed in which data used to execute a job of printing a document is accumulated in a server and the job is executed by a printer arbitrarily selected by a user from among a plurality of printers. A function in which a printer selected by a user requests a server for job data, retrieves the job data therefrom, and executes a job may be generally called "pull printing". A technique relating to the pull printing is disclosed in U.S. Pat. No. 8,582,142.

The pull printing is used appropriately, for example, in the following case: Before leaving a branch office α to visit a branch office β, a user operates a personal computer installed in the branch office α to create a document, and saves, in a server, job data used for printing the document. After arriving at the branch office β, the user selects any printer from among printers installed in the branch office β and logs onto the printer thus selected.

The selected printer requests the server for the job data, receives the job data therefrom, and then prints the document.

Meanwhile, when data for a job is generated, a user specifies a condition for executing the job. In the case of pull printing, however, when data for a job is generated, an apparatus to execute output is not specified. Accordingly, an apparatus selected later by the user in order to cause execution of the job is not always capable of executing the job based on the condition specified by the user. As a result, the user sometimes cannot obtain a resultant based on the condition desired by him/her.

SUMMARY

The present disclosure is directed to solve the problems pointed out above, and therefore, an object of an embodiment of the present invention is to, even when a user specifies later an apparatus in order to cause execution of a job based on a pull printing function, ensure that the job is executed in accordance with a condition desired by the user.

According to an aspect of the present invention, a job execution apparatus for executing a job includes a receiving portion that receives a plurality of conditions for executing the job, a first determination portion that determines, among the plurality of conditions, an executable condition based on which the job execution apparatus is adapted to execute the job, and a job execution portion that executes, if the first determination portion determines the executable condition, the job based on the executable condition.

Preferably, the receiving portion receives individual priorities of the plurality of conditions together with the plurality of conditions, and if there are a plurality of executable conditions based on which the job execution apparatus is adapted to execute the job, the job execution portion executes the job based on one of the plurality of executable conditions to which a highest priority is given.

Further, the job execution apparatus may include an output portion that outputs, to a user, a message indicating that the executable condition is not determined, if the executable condition is not determined by the first determination portion.

Further, the job execution apparatus may include a second determination portion that determines, if the executable condition is not determined by the first determination portion, whether or not at least one of other job execution apparatuses is adapted to execute the job based on any of the plurality of conditions, and an informing portion that outputs, if the second determination portion determines that at least one of other job execution apparatuses is adapted to execute the job based on any of the plurality of conditions, identification information of said at least one of other job execution apparatuses.

These and other characteristics and objects of the present invention will become more apparent by the following descriptions of preferred embodiments with reference to drawings.

BRIEF DESCRIPTION OF THE DRAWINGS

FIG. 7 is a diagram illustrating an example of a condition setting screen.

FIG. 9 is a diagram illustrating an example of an optional function table.

FIG. 11 is a diagram illustrating an example of an unprintable state notification screen.

DESCRIPTION OF THE PREFERRED EMBODIMENTS

An embodiment of the present invention is described below.

Figure 1:
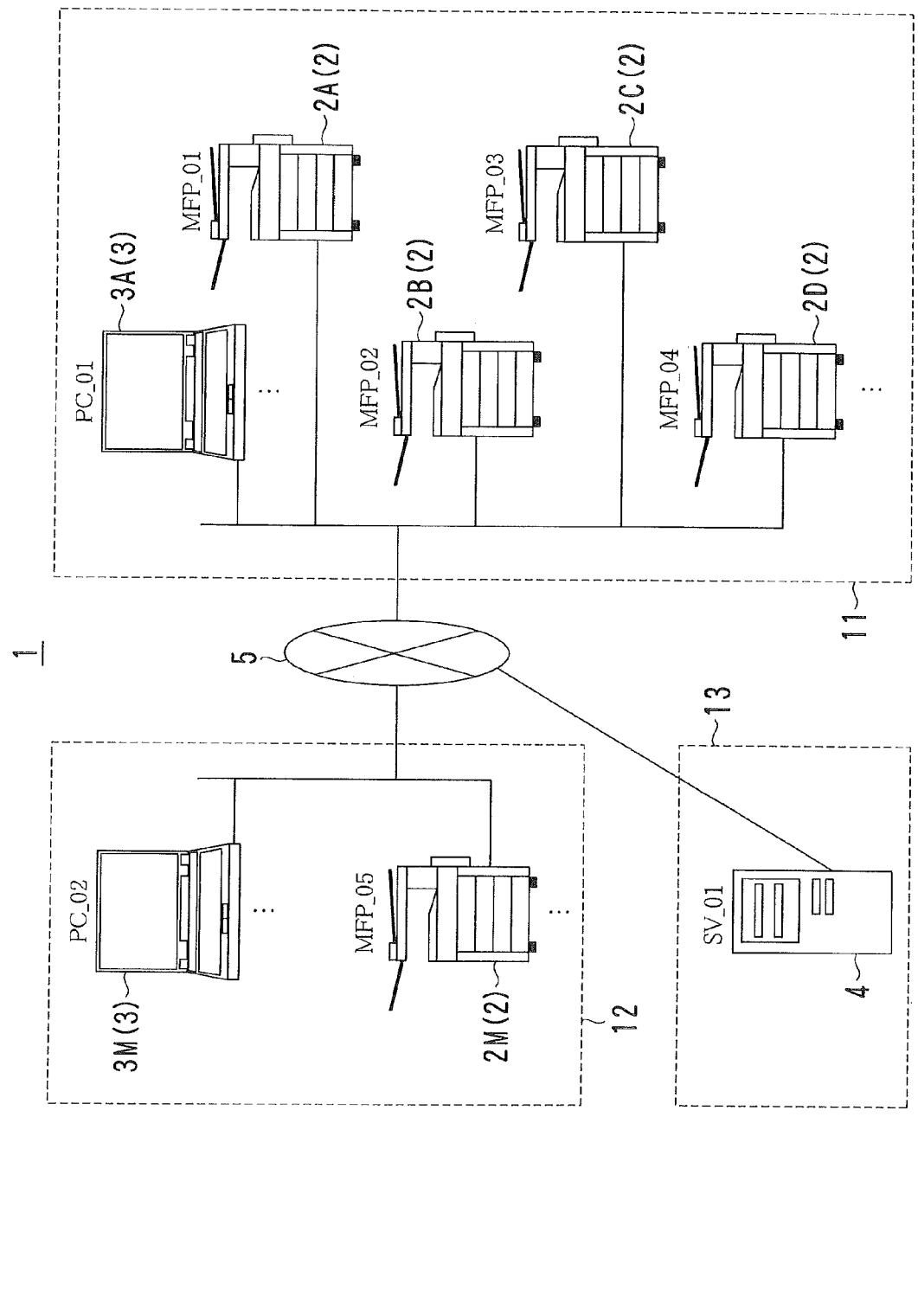
FIG. 1 is a diagram illustrating an example of the overall configuration of a printing system.
Figure 2:
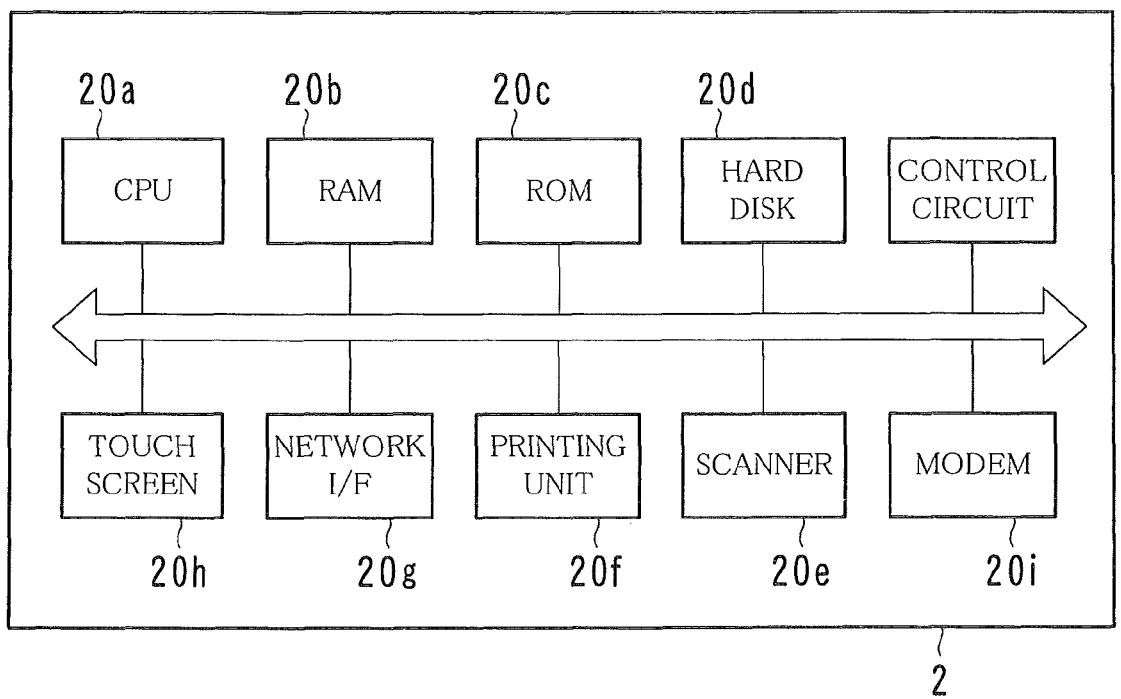
FIG. 2 is a diagram illustrating an example of the hardware configuration of an image forming apparatus.
Figure 3:
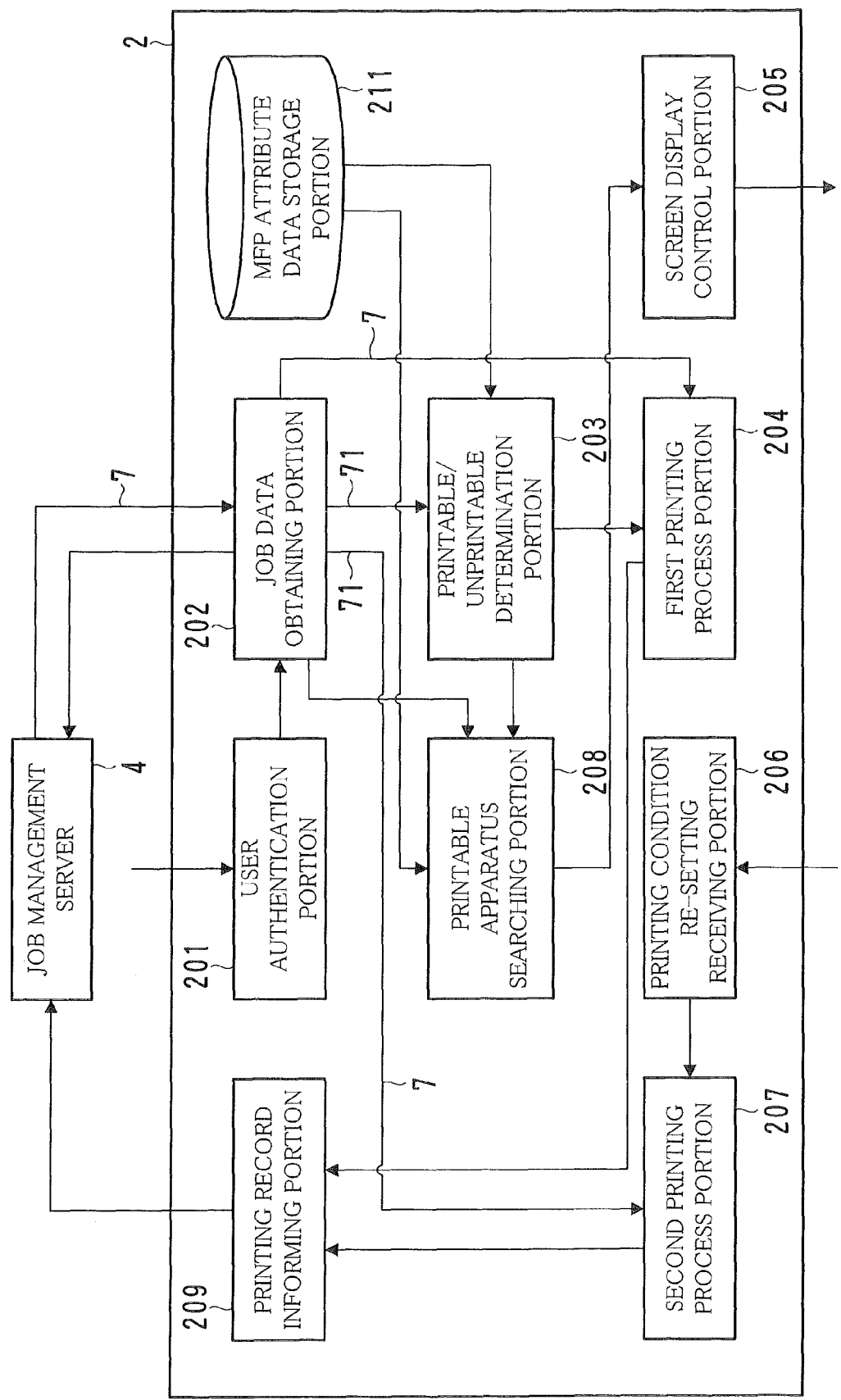
FIG. 3 is a diagram illustrating an example of the functional configuration of an image forming apparatus.
Figure 4:
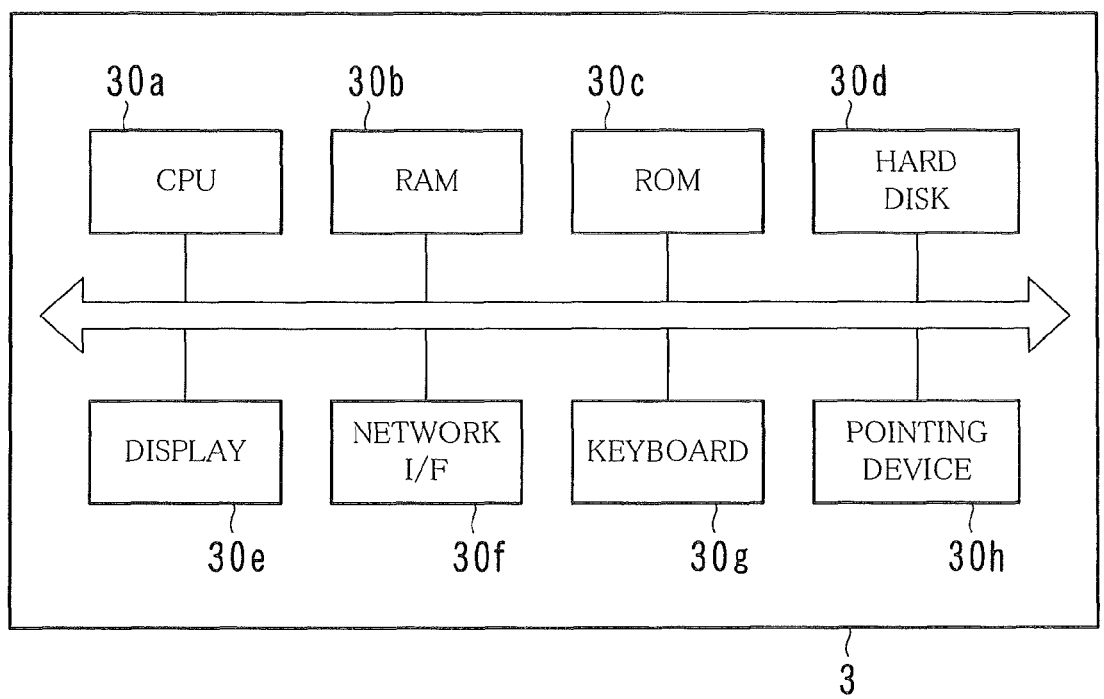
FIG. 4 is a diagram illustrating an example of the hardware configuration of a terminal.
Figure 5:
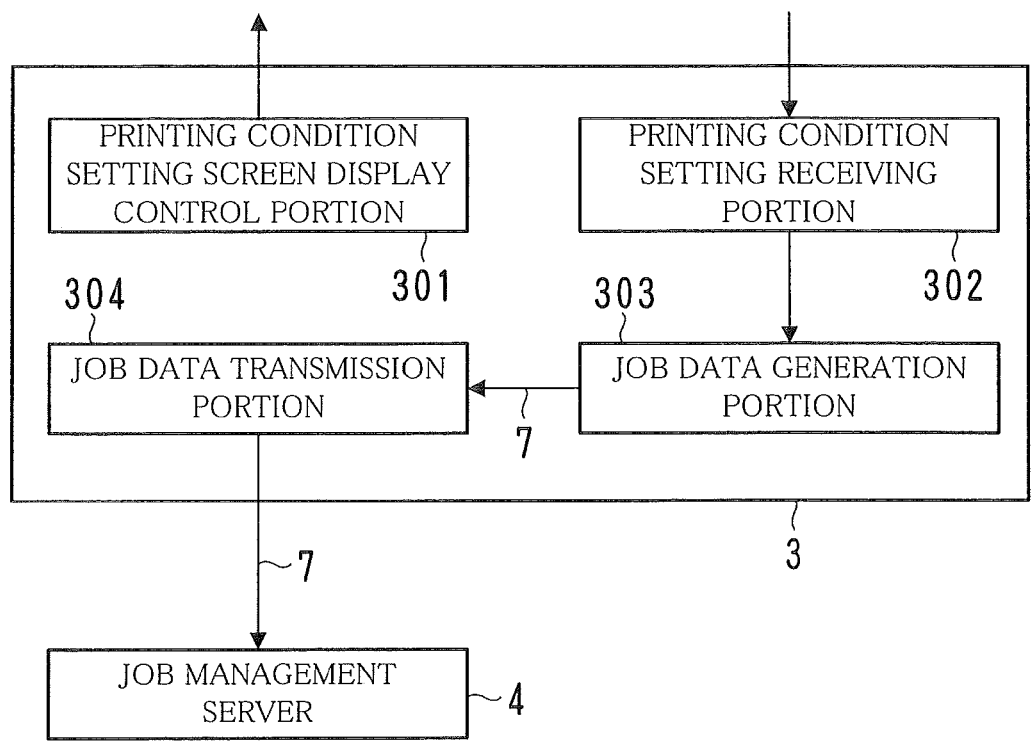
FIG. 5 is a diagram illustrating an example of the functional configuration of a terminal.
Figure 6:
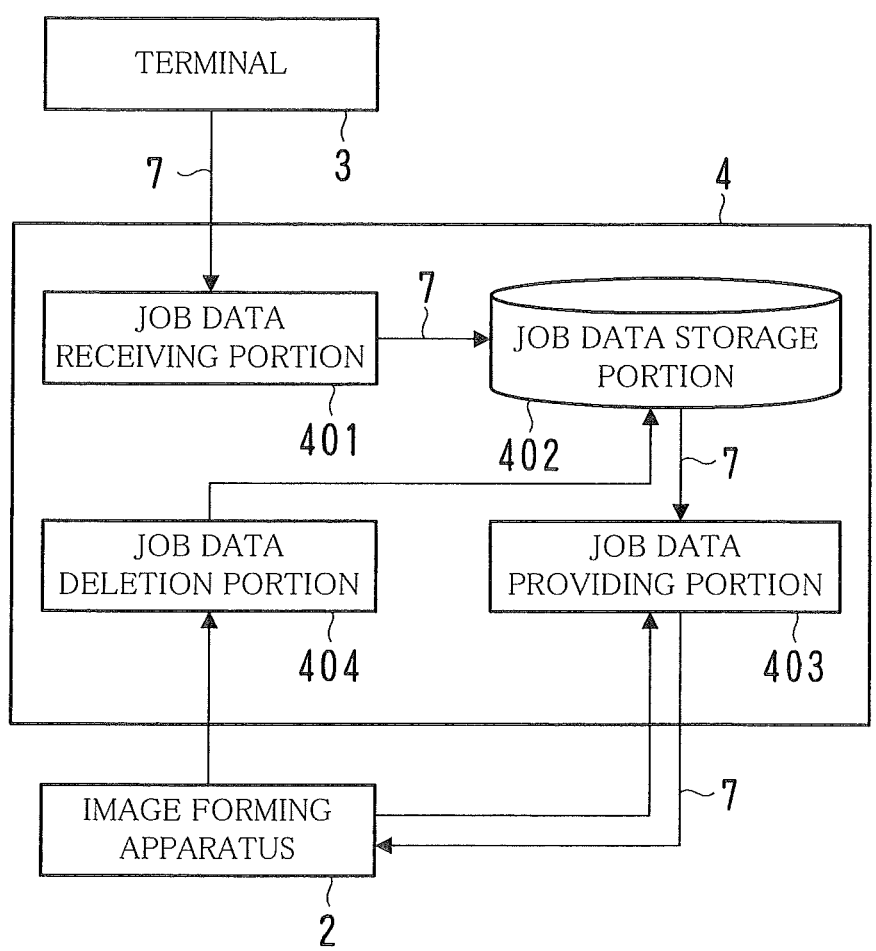
FIG. 6 is a diagram illustrating an example of the functional configuration of a job management server.

FIG. 1 is a diagram illustrating an example of the overall configuration of a printing system 1; FIG. 2 is a diagram illustrating an example of the hardware configuration of an image forming apparatus 2; FIG. 3 is a diagram illustrating an example of the functional configuration of the image forming apparatus 2; FIG. 4 is a diagram illustrating an example of the hardware configuration of a terminal 3; FIG. 5 is a diagram illustrating an example of the functional configuration of the terminal 3; and FIG. 6 is a diagram illustrating an example of the functional configuration of a job management server 4.

Referring to FIG. 1, the printing system 1 is configured of a communication line 5 and Local Area Networks (LANs) 11, 12, 13, and so on.

The printing system 1 is a system to print out a document created by using a personal computer, and to read an image represented on a paper document to create electronic data thereof. The printing system 1 is used in organizations such as business offices, public offices, or schools.

The configuration of the printing system 1 is described below, taking an example in which the printing system 1 is used in an X-company including three bases of a branch office A, a branch office B, and a management division C.

The branch office A, the branch office B, and the management division C are provided with the LAN 11, the LAN 12, and the LAN 13, respectively.

The LAN 11 is provided with image forming apparatuses 2 and terminals 3. Likewise, the LAN 12 is provided with image forming apparatuses 2 and terminals 3. The LAN 13 is provided with a job management server 4. Hereinafter, the image forming apparatuses 2 are sometimes distinguished from one another as an "image forming apparatus 2A", an "image forming apparatus 2B", and so on. Likewise, the terminals 3 are sometimes distinguished from one another as a "terminal 3A", a "terminal 3B", and so on. Further, each of the devices in the printing system 1 is given a unique device name and a unique IP address.

The LANs 11-13 are also provided with one router each. The individual routers are connected to one another via the communication line 5, which enables the individual devices within the LANs 11-13 to be connected to one another. Examples of the communication line 5 include the Internet, a public line and a dedicated line.

The image forming apparatus 2 is an apparatus generally called a multifunction device, a Multi-Function Peripheral (MFP), or the like. The image forming apparatus 2 is configured to integrate, thereinto, a variety of functions, such as copying, faxing, network printing, and scanning.

The network printing function is a function to receive image data from the terminal 3 and print an image onto paper. The network printing function is sometimes called a "network printer function", a "PC printing function", or the like. In this example, image data (print job data 7 described later) sent by the terminal 3 is temporarily accumulated in the job management server 4. Then, upon request, the image data is transmitted to the image forming apparatus 2 by means of which printing is performed. In short, so-called pull printing is performed via the job management server 4.

Referring to FIG. 2, the image forming apparatus 2 is configured of a Central Processing Unit (CPU) 20a, a Random Access Memory (RAM) 20b, a Read-Only Memory (ROM) 20c, a hard disk 20d, a scanner 20e, a printing unit 20f, a network interface 20g, a touch screen 20h, a modem 20i, a variety of control circuits, and so on.

The scanner 20e is a device that reads images printed on paper, such as photographs, characters, drawings, diagrams, and the like, and creates image data thereof.

The printing unit 20f serves to print, onto paper, an image obtained by scanning with the scanner 20e or an image included in image data received from another device. Note that a common page description language is used in the individual image forming apparatuses 2.

The touch screen 20h displays, for example, a screen for giving a message or instructions to a user, a screen for the user to enter a process command and process conditions, and a screen displaying the result of a process performed by the CPU 20a. The touch screen 20h also detects a position thereof touched by the user with his/her finger and sends a signal indicating the result of the detection to the CPU 20a.

The network interface 20g is a Network Interface Card (NIC) for communicating with another device such as the terminal 3 according to Transmission Control Protocol/Internet Protocol (TCP/IP) via the communication line 5.

The modem 20i is a device for transmitting image data via a fixed-line telephone network to another facsimile terminal and vice versa based on a protocol such as Group 3 (G3).

Referring to FIG. 3, the ROM 20c or the hard disk 20d stores programs and data for implementing functions of a user authentication portion 201, a job data obtaining portion 202, a printable/unprintable determination portion 203, a first printing process portion 204, a screen display control portion 205, a printing condition re-setting receiving portion 206, a second printing process portion 207, a printable apparatus searching portion 208, a printing record informing portion 209, an MFP attribute data storage portion 211, and the like. These programs and data are loaded into the RAM 20b as necessary, whereupon the programs are executed by the CPU 20a. The individual portions of the image forming apparatus 2 illustrated in FIG. 3 primarily perform processes for providing a user with a network printing service based on pull printing.

It is possible to equip the image forming apparatus 2 with optional functions such as Z-folding, color printing, stapling, or reduction printing.

Referring back to FIG. 1, the terminal 3 is a client to which the image forming apparatus 2 provides a network printing service.

Referring to FIG. 4, the terminal 3 is configured of a CPU 30a, a RAM 30b, a ROM 30c, a hard disk 30d, a display 30e, a network interface 30f, a keyboard 30g, a pointing device 30h, and so on.

The display 30e displays, for example, a screen for giving a message or instructions to a user, a screen for the user to enter a process command and process conditions, and a screen displaying the result of a process performed by the CPU 30a.

The keyboard 30g and the pointing device 30h are devices by means of which a user enters a command, data, and the like into the terminal 3.

The network interface 30f is a NIC for communicating with another device such as the image forming apparatus 2 according to TCP/IP via the communication line 5.

Referring to FIG. 5, the ROM 30c or the hard disk 30d stores programs and data for implementing functions of a printing condition setting screen display control portion 301, a printing condition setting receiving portion 302, a job data generation portion 303, a job data transmission portion 304, and the like. These programs and data are loaded into the RAM 30b as necessary, whereupon the programs are executed by the CPU 30a. The individual portions of the terminal 3 illustrated in FIG. 5 primarily perform processes for receiving a network printing service provided by the image forming apparatus 2. In short, the terminal 3 functions as a printer driver.

Referring back to FIG. 1, the job management server 4 accumulates, therein, print job data 7 (described later) outputted by the individual terminals 3, and transfers the print job data 7 to the image forming apparatus 2 upon request. In other words, the job management server 4 serves to relay the print job data 7 to the image forming apparatus 2.

The hardware configuration of the job management server 4 is basically the same as that of the terminal 3. As illustrated in FIG. 6, however, a hard disk of the job management server 4 stores programs and data for implementing functions of a job data receiving portion 401, a job data storage portion 402, a job data providing portion 403, a job data deletion portion 404, and the like.

Figure 8:
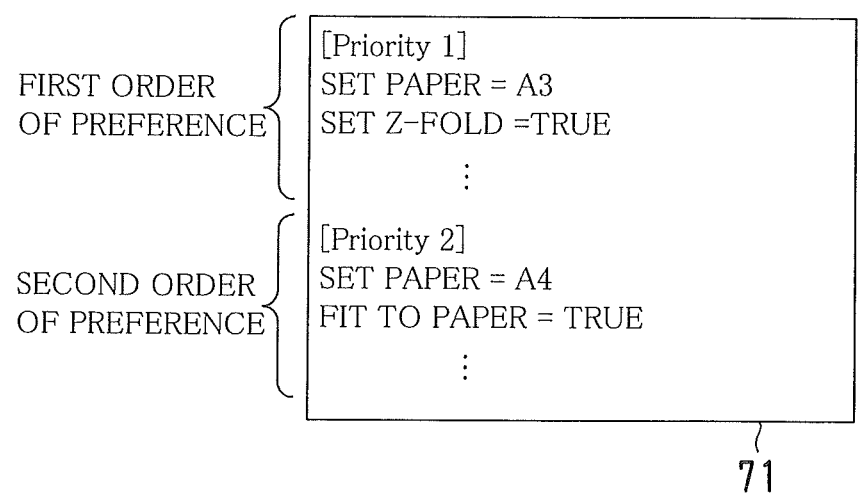
FIG. 8 is a diagram illustrating an example of condition setting data.
Figure 10:
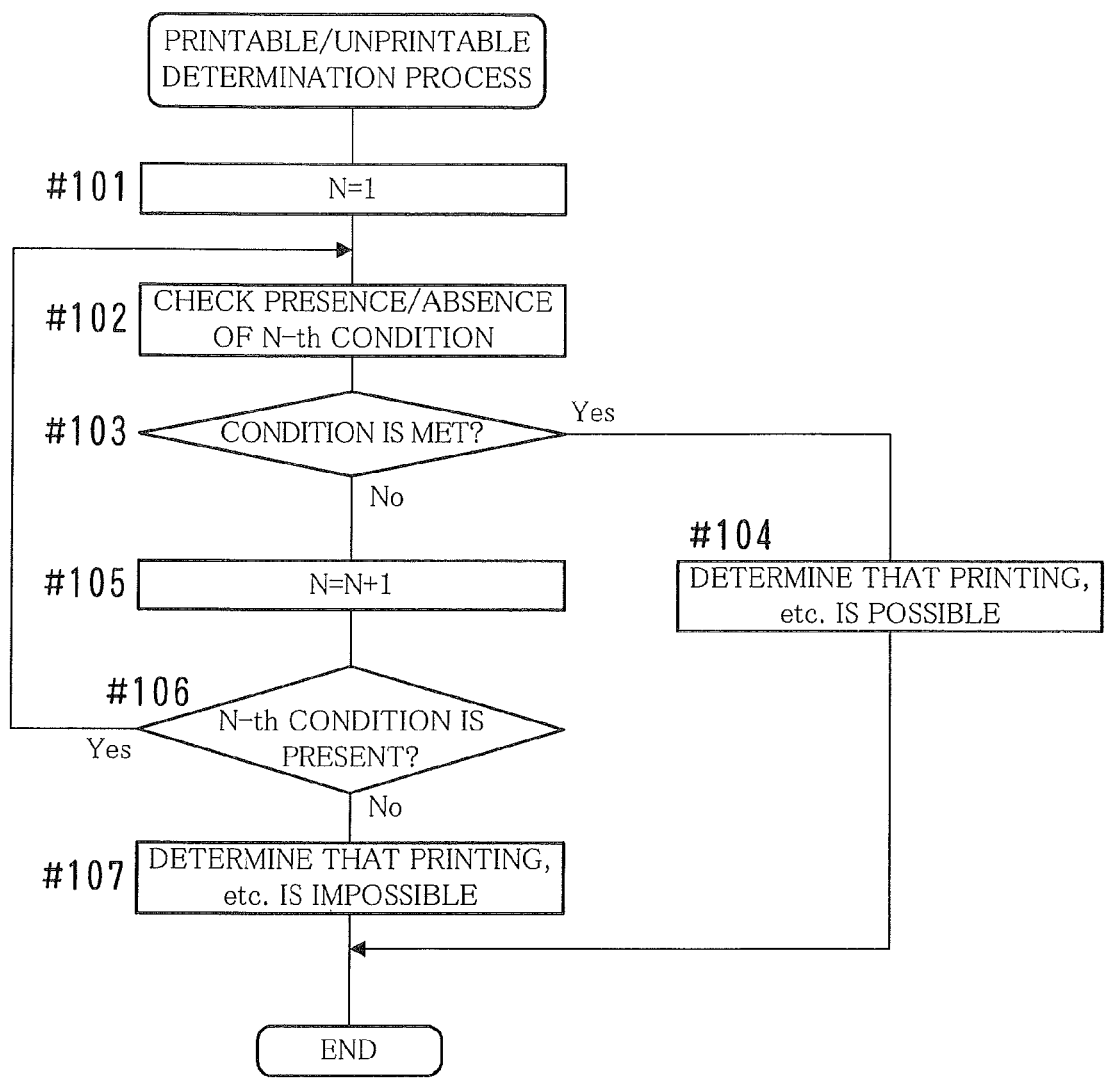
FIG. 10 is a flowchart illustrating an example of the flow of a printable/unprintable determination process.
Figure 12:
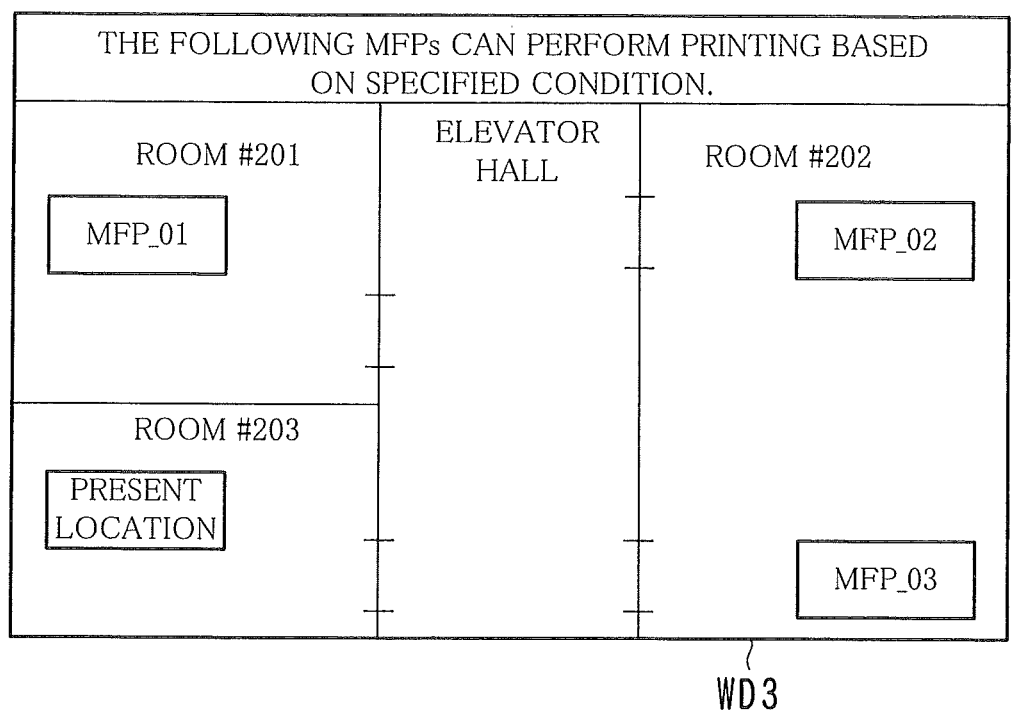
FIG. 12 is a diagram illustrating an example of a guide screen.

FIG. 7 is a diagram illustrating an example of a condition setting screen WD1; FIG. 8 is a diagram illustrating an example of condition setting data 71; FIG. 9 is a diagram illustrating an example of an optional function table TL1; FIG. 10 is a flowchart illustrating an example of the flow of a printable/unprintable determination process; FIG. 11 is a diagram illustrating an example of an unprintable state notification screen WD2; and FIG. 12 is a diagram illustrating an example of a guide screen WD3.

Descriptions are provided below of the individual portions of the image forming apparatus 2 illustrated in FIG. 3, the individual portions of the terminal 3 illustrated in FIG. 5, and the individual portions of the job management server 4 illustrated in FIG. 6.

Referring to FIG. 5, the printing condition setting screen display control portion 301 of the terminal 3 causes the display 30e to display the condition setting screen WD1 illustrated in FIG. 7 at a time when a user enters a command to print a document that is opened on the terminal 3 by using, for example, a word processing application.

The user enters and specifies, on the condition setting screen WD1, a condition based on which the document is to be printed. However, it depends on the image forming apparatuses 2 whether or not printing or finishing can be carried out in accordance with the condition specified by the user. To cope with this, the condition setting screen WD1 is configured to enable the user to specify a plurality of conditions along with an order of preference thereof. Hereinafter, such an order of preference is referred to as a "preference" or a "priority". In the illustrated example of FIG. 7, the user specifies conditions up to the second preference condition, i.e., two conditions.

The printing condition setting receiving portion 302 receives the individual conditions specified by the user on the condition setting screen WD1 along with preferences thereof.

The job data generation portion 303 generates print job data 7 for printing a document by converting data of the document to data written in a page description language corresponding to the image forming apparatus 2. At this time, the job data generation portion 303 incorporates condition setting data 71 as illustrated in FIG. 8 into the print job data 7. The condition setting data 71 indicates the individual conditions and preferences (priorities) thereof received by the printing condition setting receiving portion 302.

The job data transmission portion 304 associates the print job data 7 generated by the job data generation portion 303 with a user identification (ID) for identifying the user, and then transmits the print job data 7 to the job management server 4.

Referring to FIG. 6, the job data receiving portion 401 of the job management server 4 receives the print job data 7 transmitted from the terminal 3.

The job data storage portion 402 stores therein the print job data 7 received by the job data receiving portion 401. At this time, the association between the print job data 7 and the user ID of the user is maintained unchanged. In other words, the job data storage portion 402 stores therein the print job data 7 with the print job data 7 associated with the identification information of the user. Further, the print job data 7 is given a data ID for distinguishing the print job data 7 itself from another piece of print job data 7. The job data providing portion 403 and the job data deletion portion 404 will be described later.

Referring to FIG. 3, the MFP attribute data storage portion 211 of the image forming apparatus 2 stores, therein, the optional function table TL1 as illustrated in FIG. 9. The optional function table TL1 indicates optional functions equipped in the individual image forming apparatuses 2. Every time when an optional function is added or deleted, an administrator updates the optional function table TL1. Alternatively, the optional function table TL1 may be automatically generated by: asking an operating system about optional functions equipped in the subject image forming apparatus 2; and asking other individual image forming apparatuses 2 about optional functions equipped therein.

The function named "A3, Z-folding" is a function to print an image onto A3-sized paper, and fold the paper into a Z-shape (fold the paper in three: the combination of a mountain fold and a valley fold). The function named "A4, reduction printing" is a function to reduce an A3-sized image to an A4-sized image, and print the A4-sized image onto A4-sized paper.

The MFP attribute data storage portion 211 also stores, therein, MFP location data DT1 indicating locations at which the individual image forming apparatuses 2 are installed, and floor plan image data DT2 for reproducing an image of a floor plan of each facility.

The user authentication portion 201 performs a process for verifying the identity of a user who directly operates the subject image forming apparatus 2 in the following manner. For example, the user operates the terminal 3 to issue a command for network printing, and goes to the location at which the subject image forming apparatus 2 is installed. Then, the user operates the touch screen 20h of the subject image forming apparatus 2 to enter his/her user ID and password.

Responding to this, the user authentication portion 201 compares user IDs and passwords of the individual users which have been registered in advance in a database with the user ID and the password that have been entered by the user. If any of the user IDs and the passwords registered in the database match the user ID and the password that have been entered by the user, then the user authentication portion 201 determines that the user operating the touch screen 20h is an authentic user. In contrast, if there is no match therebetween, then the user authentication portion 201 determines that the user operating the touch screen 20h is an unauthorized user.

Instead, the user authentication may be performed by using biometric information, an Integrated Circuit (IC) card, or the like.

The job data obtaining portion 202 obtains, from the job management server 4, print job data 7 corresponding to the user ID of the user authenticated by the user authentication portion 201. To be specific, the job data obtaining portion 202 requests the job management server 4 for the print job data 7 by informing the job management server 4 of the user ID.

Upon the receipt of the request, the job data providing portion 403 (see FIG. 6) of the job management server 4 calls the print job data 7 that is stored in the job data storage portion 402 in association with the user ID informed by the job data obtaining portion 202, and transmits the print job data 7 thus called to the image forming apparatus 2 as the request source.

Referring back to FIG. 3, the printable/unprintable determination portion 203 determines whether or not the subject image forming apparatus 2 can perform printing and necessary finishing based on any of the conditions indicated in the condition setting data 71 (see FIG. 8) included in the print job data 7 obtained from the job management server 4. The determination is made according to the steps shown in the flowchart of FIG. 10.

Referring to FIG. 10, the printable/unprintable determination portion 203 extracts a condition to which the first preference (the first priority) is given from the condition setting data 71 included in the print job data 7 obtained from the job management server 4 (#101). The printable/unprintable determination portion 203 then checks whether or not the condition thus extracted is indicated in the record of the subject image forming apparatus 2 in the optional function table TL1 (see FIG. 9) stored in the MFP attribute data storage portion 211 of the subject image forming apparatus 2 (#102). If the extracted condition is indicated therein (Yes in #103), then the printable/unprintable determination portion 203 determines that printing or the like can be performed by the subject image forming apparatus 2 in accordance with the first preference condition (#104).

In the case where, for example, the condition "A3, Z-folding" is indicated as the first preference condition as illustrated in FIG. 8, the printable/unprintable determination portion 203 checks whether or not the function "A3, Z-folding" is included in the record of the subject image forming apparatus 2. If the function "A3, Z-folding" is included therein, then the printable/unprintable determination portion 203 determines that printing or the like can be performed by the subject image forming apparatus 2 in accordance with the first preference condition.

The illustrated example of FIG. 8 shows the case in which one condition relates to only one attribute. There is a case, however, in which one condition relates to a plurality of attributes. For example, it is possible that one condition relates to a plurality of attributes of "A3, Z-folding" and "color printing". In such a case, if the record of the subject image forming apparatus 2 indicates all the functions relating to the plurality of attributes, then the printable/unprintable determination portion 203 determines that printing or the like can be performed by the subject image forming apparatus 2 in accordance with the condition.

If the printable/unprintable determination portion 203 is not capable of determining that printing or the like can be performed by the subject image forming apparatus 2 in accordance with the first preference condition, then the printable/unprintable determination portion 203 extracts a condition indicated in the condition setting data 71 and to which the second preference is given (#105). Then, as with the determination based on the first preference condition, the printable/unprintable determination portion 203 checks whether or not the second preference condition extracted is indicated in the record of the subject image forming apparatus 2 (#102), then to determine whether or not printing or the like can be performed by the subject image forming apparatus 2 based on the second preference condition (#103). Note that, if only the first preference condition is indicated (No in #106), then the printable/unprintable determination portion 203 determines that printing or the like cannot be performed by the subject image forming apparatus 2 based on the condition (#107).

Thereafter, using a similar procedure, the printable/unprintable determination portion 203 extracts conditions in the order of preference and checks whether or not the extracted conditions are indicated in the record of the subject image forming apparatus 2 until it is determined that printing or the like can be performed by the subject image forming apparatus 2 based on any of the extracted conditions. If an extracted condition is entirely indicated in the record of the subject image forming apparatus 2 (Yes in #103), then the printable/unprintable determination portion 203 determines that printing or the like can be performed by the subject image forming apparatus 2 in accordance with the condition (#104). If the printable/unprintable determination portion 203 is not capable of determining that printing or the like can be performed by the subject image forming apparatus 2 in accordance with any of the extracted conditions even after checking whether or not the last preference condition is indicated in the record of the subject image forming apparatus 2 (No in #103, and No in #106), then it is determined that printing or the like cannot be performed by the subject image forming apparatus 2 in accordance with the condition specified by the user (#107).

Referring back to FIG. 3, in the case where the printable/unprintable determination portion 203 determines that printing or the like can be performed in accordance with the condition included in the condition setting data 71 of the print job data 7, the first printing process portion 204 performs a process for printing a document onto paper based on the condition setting data 71.

To be specific, the first printing process portion 204 generates bitmap data of the document based on the print job data 7, and controls the printing unit 20f to print the bitmap of the document onto paper. Note that, however, the bitmap data is generated based on, among the individual conditions included in the condition setting data 71, a condition for which the printable/unprintable determination portion 203 determines that printing is possible. Further, the first printing process portion 204 controls the printing unit 20f so that a printed material is finished based on the condition.

The screen display control portion 205 appropriately displays a screen for dealing with a case where printing or the like is impossible in accordance with the condition included in the condition setting data 71.

To be specific, the screen display control portion 205 causes the touch screen 20h to display the unprintable state notification screen WD2 as that illustrated in FIG. 11 at a time when the printable/unprintable determination portion 203 determines that printing or the like cannot be performed by the subject image forming apparatus 2 in accordance with the condition included in the condition setting data 71. The unprintable state notification screen WD2 indicates the fact that the subject image forming apparatus 2 cannot perform printing or the like as desired by the user. The unprintable state notification screen WD2 also indicates optional measures to deal with such a case.

The user presses a "PRINT" button as long as it is acceptable to obtain a printed material from the subject image forming apparatus 2 although it is impossible to obtain a printed material in accordance with the condition specified by the user on the terminal 3. Alternatively, the user presses a "CHANGE" button if the user intends to cause another image forming apparatus 2 to perform a printing process in order to obtain a printed material in accordance with the condition specified by the user. Yet alternatively, the user presses a "CANCEL" button to cancel the printing process.

If the user presses the "PRINT" button on the unprintable state notification screen WD2, then the printing condition re-setting receiving portion 206 causes the touch screen 20h to display a screen for the user to specify again a condition for printing the document, and receives the condition specified again by the user. Note that, however, the screen for specifying a condition again is configured to enable the user to specify only a condition regarding printing and finishing that is available in the subject image forming apparatus 2. The user can specify only one (one set of) desired condition.

The second printing process portion 207 performs basically the same process as that of the first printing process portion 204. To be specific, the second printing process portion 207 generates bitmap data and controls the printing unit 20f in such a manner that the document is printed onto paper based on the print job data 7 transmitted from the job management server 4 and the printed material is finished based thereon. In this case, however, the second printing process portion 207 generates bitmap data and controls the printing unit 20f in such a manner that printing and finishing are performed based on the condition received by the printing condition re-setting receiving portion 206 instead of the condition indicated in the condition setting data 71 included in the print job data 7.

If the user presses the "CHANGE" button on the unprintable state notification screen WD2, then the printable apparatus searching portion 208 searches for other image forming apparatuses 2 that are capable of performing printing and finishing based on any of the conditions indicated in the condition setting data 71. In other words, the printable apparatus searching portion 208 determines whether or not each of the other image forming apparatuses 2 can perform printing and finishing based on any of the conditions, and thereby to select the image forming apparatuses 2 that can perform printing and finishing based on any of the conditions. The method for determination is the same as the method for determining whether or not the subject image forming apparatus 2 itself can perform printing and finishing described earlier with reference to FIG. 10. However, individual records of the other image forming apparatuses 2, among records included in the optional function table TL1, are used instead of the record of the subject image forming apparatus 2.

Then, the screen display control portion 205 causes the touch screen 20h to display the guide screen WD3 (see FIG. 12) including a list of other image forming apparatuses 2 that have been searched for (selected). The guide screen WD3 is generated based on the search result obtained by the printable apparatus searching portion 208, the MFP location data DT1, and the floor plan image data DT2.

The user may check, referring to the guide screen WD3, a location at which an image forming apparatus 2 capable of performing printing and finishing in accordance with the condition desired by the user is installed, and move to the location to perform again the operation discussed above. In this way, the user can obtain a printed material that has been printed and finished in accordance with the desired condition.

In the case where a document is printed by the first printing process portion 204 or the second printing process portion 207, the printing record informing portion 209 informs the job management server 4 of the fact that the printing has been completed. At this time, the printing record informing portion 209 also informs the job management server 4 of a data ID of the print job data 7 that has been used for the printing.

Responding to this, the job data deletion portion 404 (see FIG. 6) of the job management server 4 deletes, from the job data storage portion 402, the print job data 7 having the data ID informed by the printing record informing portion 209.

If the user presses the "CANCEL" button on the unprintable state notification screen WD2, then the printing record informing portion 209 informs the job management server 4 of the fact that printing of the document is to be cancelled. At this time, the printing record informing portion 209 also informs the job management server 4 of a data ID of the print job data 7 for printing the document.

Responding to this, the job data deletion portion 404 of the job management server 4 deletes, from the job data storage portion 402, the print job data 7 having the data ID informed by the printing record informing portion 209.

Figure 13:
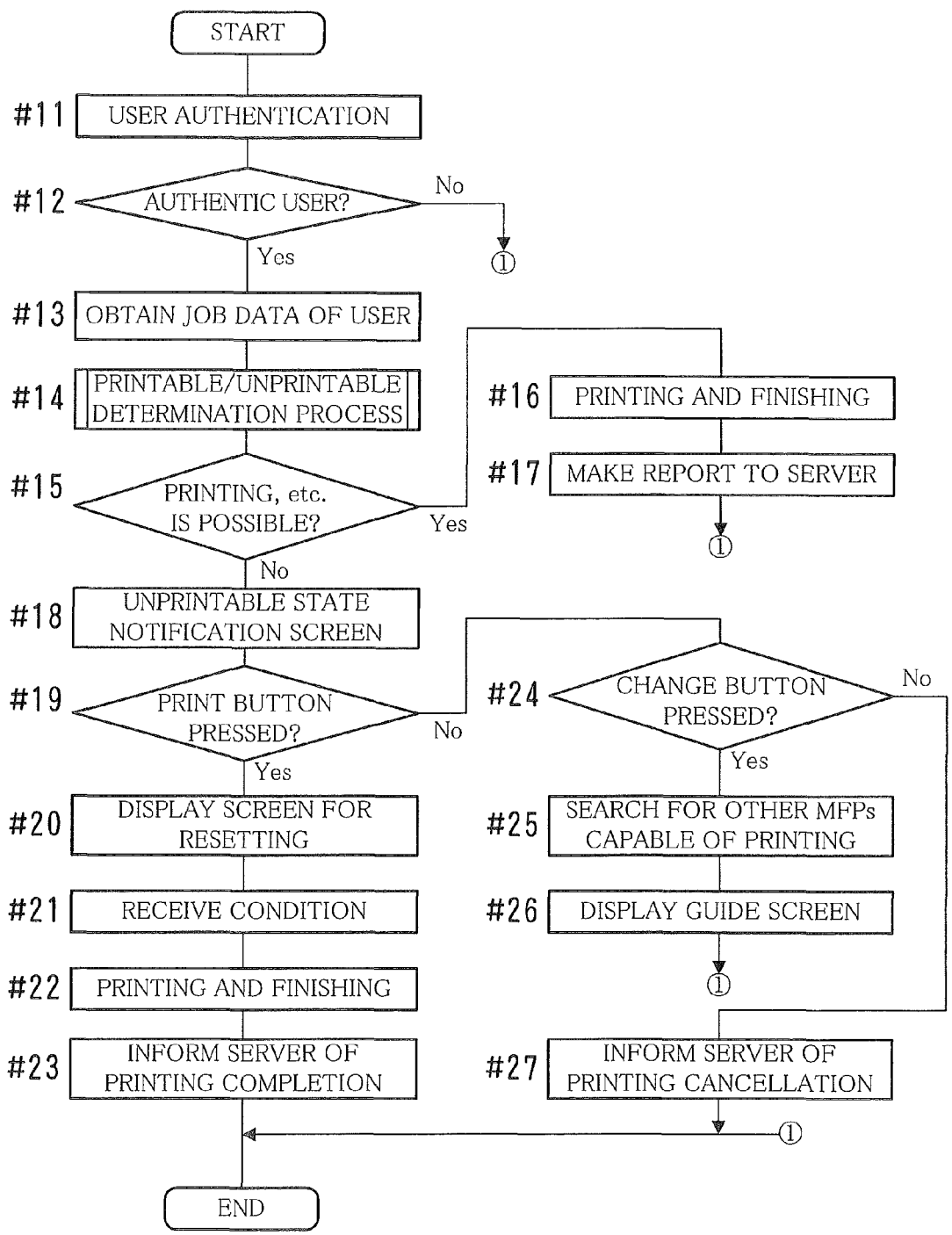
FIG. 13 is a flowchart illustrating an example of the overall processing flow of an image forming apparatus.

FIG. 13 is a flowchart illustrating an example of the overall processing flow of the image forming apparatus 2. The overall processing flow of the image forming apparatus 2 is described below with reference to the flowchart of FIG. 13, taking an example in which a user Y belonging to the branch office B visits the branch office A and uses an image forming apparatus 2D installed in the branch office A.

Before visiting the branch office A, the user Y creates an A3-sized document by operating a terminal 3M, and enters a command to print the document thereinto. In this instance, the user Y specifies "A3, Z-folding" as the first preference condition, and "A4, reduction printing" as the second preference condition.

Then, the terminal 3M converts data of the document created by the user Y into data described in a page description language, and adds thereto the condition setting data 71 illustrated in FIG. 8, so that print job data 7 is generated. The terminal 3M associates the print job data 7 with a user ID of the user Y and transfers the print job data 7 to the job management server 4. In this way, the user Y is ready to visit the branch office A.

When leaving the branch office B and arriving at the branch office A, the user Y operates any image forming apparatus 2 installed in the branch office A to attempt to log thereonto. In other words, the user Y enters his/her user ID and password into any image forming apparatus 2. In this example, the user Y enters his/her user ID and password into the image forming apparatus 2D.

Responding to this, the image forming apparatus 2D compares individual user IDs and passwords that have been registered in advance in a database with the user ID and the password that have been entered by the user, and thereby, checks whether or not the user Y is an authentic user (#11 in FIG. 13). In short, the image forming apparatus 2D performs user authentication.

If confirming that the user Y is an authentic user (Yes in #12), then the image forming apparatus 2D informs the job management server 4 of the user ID entered by the user Y, i.e., the user ID of the user Y, to obtain print job data 7 of the user Y (#13).

The condition setting data 71 included in the print job data 7 indicates one or more conditions regarding printing and finishing. The image forming apparatus 2D determines, starting from a condition to which the highest preference is given, whether or not printing and finishing can be performed based on the condition (#14). The detailed steps of the determination are the same as those discussed earlier with reference to FIG. 10.

If determining that printing and finishing can be performed based on any of the conditions (Yes in #15), then the image forming apparatus 2D performs printing of a document and finishing of a printed material based on the condition, that is, the condition to which the highest preference is given and which corresponds to the function of the image forming apparatus 2D (#16). Then, the image forming apparatus 2D informs the job management server 4 of the fact that printing has been completed, together with the data ID of the print job data 7 (#17).

In the illustrated examples of FIGS. 8 and 9, the image forming apparatus 2D is not capable of performing printing and finishing based on any of the two conditions specified by the user Y. The image forming apparatus 2D, therefore, makes a determination accordingly in Step #14.

If determining that printing or finishing cannot be performed based on any of the conditions (No in #15), then the image forming apparatus 2D displays the unprintable state notification screen WD2 illustrated in FIG. 11 (#18).

The user Y presses the "PRINT" button if he/she does not necessarily obtain a printed material in accordance with the condition specified by the user Y on the terminal 3M.

Responding to this (Yes in #19), the image forming apparatus 2D displays a screen for the user Y to specify again a condition (#20), and receives the condition desired by the user Y, provided that the image forming apparatus 2D can perform printing and finishing based on the desired condition (#21). Then, the image forming apparatus 2D performs printing of the document and finishing of a printed material based on the desired condition (#22). The image forming apparatus 2D informs the job management server 4 of the fact that printing has been completed, together with the data ID of the print job data 7 of the document (#23).

Alternatively, the user Y presses a "CHANGE" button on the unprintable state notification screen WD2 if the user Y intends to obtain, from another image forming apparatus 2, a printed material in accordance with the condition specified by the user Y on the terminal 3M.

Responding to this (Yes in #24), the image forming apparatus 2D searches for other image forming apparatuses 2 that are capable of performing printing and finishing based on any of the conditions indicated in the condition setting data 71 (#25). In other words, with respect to each of the other image forming apparatuses 2 installed in the branch office A, the image forming apparatus 2D determines whether or not printing and finishing can be performed thereby based on any of the conditions indicated in the condition setting data 71. The steps of the determination process are the same as those discussed earlier with reference to FIG. 10.

The image forming apparatus 2D then displays the guide screen WD3 illustrated in FIG. 12, thereby to inform the user Y of the individual locations of other image forming apparatuses 2 that have been searched for (#26). The user Y moves to a location at which any one of the searched image forming apparatuses 2 is installed, logs thereonto, and obtains a printed material therefrom.

In the illustrated examples of FIGS. 8 and 9, the image forming apparatuses 2A, 2B, and 2C have been searched for. Thus, the user Y moves to a location at which any one of the image forming apparatuses 2A, 2B, and 2C is installed, and logs thereonto, so that the user Y can obtain a printed material therefrom. The guide screen WD3 may be configured to not only indicate the locations of the image forming apparatuses 2A, 2B, and 2C, but also indicate conditions based on which the image forming apparatuses 2A, 2B, and 2C are capable of performing printing and finishing.

The user Y presses the "CANCEL" button on the unprintable state notification screen WD2 if it becomes unnecessary to print the document.

Responding to this (No in #24), the image forming apparatus 2D informs the job management server 4 of the fact that printing is to be cancelled, together with the user ID of the print job data 7 of the document (#25).

Upon receiving the indication of printing or cancellation, the job management server 4 deletes the print job data 7 corresponding to the user ID received together with the indication.

Compared to conventional techniques, the present embodiment ensures that a user obtains a printed material in accordance with a condition desired by the user even when the user issues a print command at the branch office A, and thereafter visits the branch office B, then to cause an image forming apparatus 2 installed in the branch office B to perform pull printing.

In the present embodiment, a print job is taken as an example of a job. The present invention, however, is applicable to jobs other than the print job.

In the present embodiment, in the case where the image forming apparatus 2 satisfies a plurality of conditions specified by a user, a job is executed based on the top priority condition among the plurality of conditions. Instead, another configuration is possible in which a user is prompted to select any one of the plurality of conditions and a job is executed based on the selected condition.

In the embodiments discussed above, the overall configurations of the printing system 1 and the image forming apparatus 2, the configurations of various portions thereof, the content to be processed, the processing order, the configuration of the tables, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus for executing a job, comprising:
    a hardware processor configured to:
        receive a job request including a plurality of alternative sets of executing conditions set by a user from a terminal, each alternative set of executing conditions having a different combination of a plurality of job conditions, wherein the plurality of job conditions of an alternative set of the plurality of alternative sets are not present in other alternative sets of the plurality of alternative sets, each combination resulting in an output that differs from outputs resulting from others of the plurality of alternative sets of executing conditions;
        receive priorities for each of the plurality of alternative sets of executing conditions;
        determine which one or more of the alternative sets of executing conditions of the job request are executable based on available functions of the image forming apparatus, an alternative set of executing conditions being executable when each of the plurality of job conditions corresponding to the alternative set of executing conditions is performable by the available functions of the image forming apparatus;
        execute the received job request according to the plurality of job conditions of the executable one or more alternative sets of executing conditions based on the received priorities of the executable one or more alternative sets of executing conditions, wherein no portion of the job request is executed when the hardware processor determines that none of the alternative sets of executing conditions are executable based on the available functions of the image forming apparatus.

2. The image forming apparatus according to claim 1, wherein the hardware processor receives priorities for each of the plurality of alternative sets of executing conditions, together with the plurality of alternative sets of executing conditions, and when there are a plurality of alternative sets of executing conditions that are determined to be executable by the image forming apparatus, the hardware processor executes the job based on one of the plurality of alternative sets of executing conditions that is determined to be executable and to which a highest priority is given.

3. The image forming apparatus according to claim 1, wherein the hardware processor is further configured to output, to a user, a message indicating that the plurality of alternative sets of executing conditions are not determined to be executable, when the first determination portion does not determine that at least one of the plurality of alternative sets of executing conditions is executable by the image forming apparatus.

4. The image forming apparatus according to claim 1, wherein the hardware processor is further configured to:

determine, when the hardware processor does not determine that at least one of the plurality of alternative sets of executing conditions is executable by the image forming apparatus, whether or not at least one of other image forming apparatuses is adapted to execute the job based on any of the plurality of alternative sets of executing conditions, and output, when the second determination portion determines that at least one of other image forming apparatuses is adapted to execute the job based on any of the plurality of alternative sets of executing conditions, identification information of said at least one of other image forming apparatuses.

5. A job execution method for causing an image forming apparatus to execute a job, the method comprising:

a process of obtaining, from a user, a plurality of alternative sets of executing conditions set by a user from a terminal, each alternative set of executing conditions having a different combination of a plurality of job conditions, wherein the plurality of job conditions of an alternative set of the plurality of alternative sets are not present in other alternative sets of the plurality of alternative sets, each combination resulting in an output that differs from outputs resulting from others of the plurality of alternative sets of executing conditions, receiving priorities for each of the plurality of alternative sets of executing conditions;

a process of determining which one or more of the alternative sets of executing conditions of the job request are executable based on available functions of the image forming apparatus, an alternative set of executing conditions being executable when each of the plurality of job conditions corresponding to the alternative set of executing conditions is performable by the available functions of the image forming apparatus; and a process of executing the received job request according to the plurality of job conditions of the executable one or more alternative sets of executing conditions based on the received priorities of the executable one or more alternative sets of executing conditions, wherein no portion of the job request is executed when the hardware processor determines that none of the alternative sets of executing conditions are executable based on the available functions of the image forming apparatus.

6. The job execution method according to claim 5, wherein the process of obtaining includes receiving priorities for each of the plurality of alternative sets of executing conditions, together with the plurality of alternative sets of executing conditions, and if there are a plurality of alternative sets of executing conditions that are determined to be executable by the image forming apparatus, the job is executed based on one of the plurality of alternative sets of executing conditions that is determined to be executable and to which a highest priority is given.

7. The job execution method according to claim 5, further comprising causing the image forming apparatus to perform a process of outputting, to the user, a message indicating that the plurality of alternative sets of executing conditions are not determined to be executable, when the plurality of alternative sets of executing conditions are not determined to be executable.

8. The job execution method according to claim 5, further comprising causing the image forming apparatus to perform:

a process of determining, when the plurality of alternative sets of executing conditions are not determined to be executable, whether or not at least one of other image forming apparatuses is adapted to execute the job based on any of the plurality of alternative sets of executing conditions, and a process of outputting, if it is determined that at least one of other image forming apparatuses is adapted to execute the job based on any of the plurality of alternative sets of executing conditions, identification information of said at least one of other image forming apparatuses.

9. A non-transitory computer-readable storage medium storing thereon a computer program used in an image forming apparatus for executing a job, the computer program causing the image forming apparatus to perform:

a process of obtaining a plurality of alternative sets of executing conditions from a user from a terminal, each alternative set of executing conditions having a different combination of a plurality of job conditions, wherein the plurality of job conditions of an alternative set of the plurality of alternative sets are not present in other alternative sets of the plurality of alternative sets, each combination resulting in an output that differs from outputs resulting from others of the plurality of alternative sets of executing conditions, receiving priorities for each of the plurality of alternative sets of executing conditions, a process of determining which one or more of the alternative sets of executing conditions of the job request are executable based on available functions of the image forming apparatus, an alternative set of executing conditions being executable when each of the plurality of job conditions corresponding to the alternative set of executing conditions is performable by the available functions of the image forming apparatus, and a process of executing the received job request according to the plurality of job conditions of the executable one or more alternative sets of executing conditions based on the received priorities of the executable one or more alternative sets of executing conditions,
wherein no portion of the job request is executed when the hardware processor determines that none of the alternative sets of executing conditions are executable based on the available functions of the image forming apparatus.

10. The non-transitory computer-readable storage medium according to claim 9, wherein
the process of obtaining includes receiving priorities for each of the plurality of alternative sets of executing conditions, together with the plurality of alternative sets of executing conditions, and
if there are a plurality of alternative sets of executing conditions that are determined to be executable by the image forming apparatus, the job is executed based on one of the plurality of alternative sets of executing conditions that is determined to be executable and to which a highest priority is given.

11. The non-transitory computer-readable storage medium according to claim 9, the computer program causing the image forming apparatus to further perform a process of outputting, to a user, a message indicating that the plurality of alternative sets of executing conditions are not determined to be executable, when the plurality of alternative sets of executing conditions are not determined to be executable.

12. The non-transitory computer-readable storage medium according to claim 9, the computer program causing the image forming apparatus to further perform
a process of determining, when the plurality of alternative sets of executing conditions are not determined to be executable, whether or not at least one of other image forming apparatuses is adapted to execute the job based on any of the plurality of alternative sets of executing conditions, and
a process of outputting, if it is determined that at least one of other image forming apparatuses is adapted to execute the job based on any of the plurality of alternative sets of executing conditions, identification information of said at least one of other image forming apparatuses.

13. The image forming apparatus according to claim 1, wherein the alternative sets of executing conditions is contained in one set of print job data and is related to printing and finishing, and
the plurality of alternative sets of executing conditions are set to have details different from one another so that outputs different from one another are obtained based on one set of print job data.

14. The job execution method according to claim 5, wherein the alternative sets of executing conditions is contained in one set of print job data and is related to printing and finishing, and
the plurality of alternative sets of executing conditions are set to have details different from one another so that outputs different from one another are obtained based on one set of print job data.

15. The non-transitory computer-readable storage medium according to claim 9, wherein the alternative sets of executing conditions is contained in one set of print job data and is related to printing and finishing, and
the plurality of alternative sets of executing conditions are set to have details different from one another so that outputs different from one another are obtained based on one set of print job data.

16. A job execution system comprising a terminal and an image forming apparatus, wherein the terminal includes:
a hardware processor configured to:
receive a job request including a plurality of alternative sets of printing conditions for each print job from a user, each alternative set of printing conditions having a different combination of a plurality of printing conditions, wherein the plurality of job conditions of an alternative set of the plurality of alternative sets are not present in other alternative sets of the plurality of alternative sets;
receive priorities for each of the plurality of alternative sets of executing conditions;
generate job data containing the plurality of alternative sets of printing conditions for each print job; and
transmit the job data to the image forming apparatus; and
the image forming apparatus includes a hardware processor configured to:
determine whether or not a print job can be executed from at least one of the plurality of alternative sets of printing conditions contained in the job data sent from the terminal based on available functions of the image forming apparatus, an alternative set of printing conditions being executable when each of the plurality of printing conditions corresponding to the alternative set of printing conditions is performable by the available functions of the image forming apparatus;
execute the received job request according to the plurality of job conditions of the executable one or more alternative sets of executing conditions based on the received priorities of the executable one or more alternative sets of executing conditions,
wherein no portion of the print job is executed when the hardware processor determines that none of the alternative sets of printing conditions are executable based on the available functions of the image forming apparatus.

17. The job execution system according to claim 16, wherein the hardware processor is further configured to: the job is executed based on one of the plurality of alternative sets of printing conditions that is determined to be executable and to which a highest priority is given.

18. A terminal comprising:
a hardware processor configured to:
receive a job request including a plurality of alternative sets of printing conditions designating functions of an image forming apparatus for said each print job from a user, each alternative set of printing conditions having a different combination of a plurality of printing conditions, wherein the plurality of job conditions of an alternative set of the plurality of alternative sets are not present in other alternative sets of the plurality of alternative sets;
receive priorities for each of the plurality of alternative sets of executing conditions;
generate, for said each print job, job data containing the plurality of alternative sets of printing conditions received by the receiver; and
transmit the job data to the image forming apparatus so that the image forming apparatus determines which one or more of the alternative sets of executing conditions of the job request are executable based on available functions of the image forming apparatus and is caused to execute a job based on the generated job data and based on the received priorities of the executable one or more alternative sets of executing conditions, and wherein no portion of the job request is executed when it is determined that none of the alternative sets of executing conditions are executable based on the available functions of the image forming apparatus.

* * * * *